United States Patent [19]

Scott

[11] Patent Number: 5,543,818

[45] Date of Patent: Aug. 6, 1996

[54] METHOD AND APPARATUS FOR ENTERING TEXT USING AN INPUT DEVICE HAVING A SMALL NUMBER OF KEYS

[75] Inventor: Ed Scott, Anaheim Hills, Calif.

[73] Assignees: Sony Corporation, Tokyo, Japan; Sony Trans Com Inc., Park Ridge, N.J.

[21] Appl. No.: 457,807

[22] Filed: Jun. 1, 1995

Related U.S. Application Data

[63] Continuation of Ser. No. 242,129, May 13, 1994, abandoned.

[51] Int. Cl.$^6$ ....................................... G09G 3/02
[52] U.S. Cl. ........................... 345/168; 345/160; 345/146
[58] Field of Search ...................... 345/146, 145, 345/156, 160, 168, 169, 171, 172; 178/18, 19; 341/22; 273/148 B

[56] References Cited

U.S. PATENT DOCUMENTS

| | | | |
|---|---|---|---|
| 4,310,839 | 1/1982 | Schwerdt | 345/146 |
| 4,709,387 | 11/1987 | Masuda | 345/172 |
| 5,198,802 | 3/1993 | Bertram et al. | 345/146 |

OTHER PUBLICATIONS

Promotional Materials: "Modular Windows SDK for the PC v 1.0–Backgrounder," Microsoft Corporation, Dec. 1992.
Promotional Materials: "Microsoft Modular Windows" Microsoft Corporation 1992.

*Primary Examiner*—Richard Hjerpe
*Assistant Examiner*—Doon Chow
*Attorney, Agent, or Firm*—Limbach & Limbach

[57] ABSTRACT

A method and apparatus for entering alphanumeric or other text to a computer system using an input device having a small number of keys. The computer system includes a processor programmed to display a character selection menu (including displayed groups of characters), to move a displayed cursor from one group to another in response to actuation of at least one cursor movement key on the input device, and to select a character within a group in response to actuation of one of at least two selection keys on the input device. The invention reduces the maximum number of keystrokes required conventionally to select a character from a character set, and enables character selection from a larger set of displayed characters using no more keystrokes than required conventionally to select the same character from a smaller set. In preferred embodiments, the input device has A cursor movement keys and B selection keys, where each of A and B is a integer less than twelve, and the character selection menu includes C groups of B characters (where C is a positive integer). Preferably, A=B=4, and C=16. The inventive system can be interfaced with a passenger information network, for example to enable a passenger to manipulate a hand-held controller having few keys to enter a mailing address for a product purchased by the passenger.

20 Claims, 3 Drawing Sheets

METHOD AND APPARATUS FOR ENTERING TEXT USING AN INPUT DEVICE HAVING A SMALL NUMBER OF KEYS

This is a continuation of application Ser. No. 08/242,129 filed on May 13, 1994, now abandoned.

FIELD OF THE INVENTION

The invention pertains to methods and apparatus for entering alphanumeric or other text into a computer system using an input device having a small number of keys. More particularly this invention pertains to the entry of text using buttons on a hand controller device and an on-screen image of the alphanumeric (or other) characters available for entry, especially where the display screen exhibits limited resolution.

BACKGROUND OF THE INVENTION

Some conventional computer input devices include a small number of data entry keys or buttons (e.g., two, eight, or ten keys), rather than the large number (typically more than eighty) on conventional computer keyboards for entering alphanumeric characters. Examples of such input devices include computer user interface hand controllers of interactive cable television (ICTV) set top boxes and interactive multimedia systems, which hand controllers include a small number of data entry buttons (e.g., two, four, eight, or ten buttons).

Other commercially available computer game systems typically include computer input devices having a small number of data entry keys or buttons.

For example, commercially available products known as the Tandy Video Information System multimedia player, and game systems marketed by Nintendo and Sega, include input devices (e.g., game controllers) designed to be held by both hands of a user. Each such input device has two sets of four buttons: one set arranged for manipulation by the right hand of a user, and the other set for manipulation by the user's left hand. By manipulating buttons of this type of input device, a user can input alphanumeric text to a processor programmed with a conventional operating system (such as the Microsoft Modular Windows operating system available from Microsoft Corporation). The programmed processor of the multimedia player (or game system) displays representations of a large number of available alphanumeric characters, moves a displayed cursor among the displayed characters (in response to button actuations executed by a user of the input device), and enters a character whose representation is "highlighted" by the cursor (in response to user depression of a "selection" button on the input device). However, the manner in which this conventional system enters alphanumeric text is time-consuming and inefficient in that the user often must execute many (many more than six) button actuations in order to move the displayed cursor to a desired one of the displayed character representations.

Throughout this specification, the term "key" is used in a broad sense to include any key or button (whether having dedicated or programmable function) that is actuatable by a digit of a human user. Thus, "key" may be used herein (depending on the context) to denote a button of a hand controller of an ICTV or multimedia player.

SUMMARY OF THE INVENTION

The invention is a method and apparatus for entering alphanumeric or other text into a computer system using an input device having a small number of keys. The computer system includes a processor programmed to display a character selection menu (including displayed groups of characters). The processor is also programmed to move a displayed cursor from one character group to another in response to actuation of one or more cursor movement keys on the input device, and to select a character within a group in response to actuation of a selected one of two or more selection keys on the input device.

The invention reduces the maximum number of keystrokes required for inputting a selected character, from a set of characters into a computer system, to a number of keystrokes below that required to select and input the same character from the same set of characters using a conventional system with the same input device. The invention also enables selection of any character (for entry into a computer system) from a large set of characters (representations of which are displayed on a menu) using no more keystrokes than would be required to select the same character from a smaller set of characters using a conventional system with the same input device.

Optionally, the input device of the invention includes a shift key, and the processor is programmed with software for displaying different character selection menus in response to actuation of the shift key. For example, the processor may display a menu of lower case characters when the user strikes the shift key, and then display a menu of upper case characters the next time the user strikes the shift key.

In a preferred embodiment, the inventive input device has eight keys (four cursor movement keys and four selection keys), each displayed character selection menu displays representations of characters in four-character groups ("quads"), the processor of the computer system is programmed to move a displayed cursor from group to group on the menu in response to actuation of the cursor movement keys, and the processor is programmed to select a character within a group in response to actuation of the selection keys.

In other preferred embodiments, the inventive input device has A cursor movement keys and B selection keys (where A and B are integers, A+B is less than twelve, and B is not less than two), each displayed character selection menu displays representations of characters in B-character groups, the processor of the computer system is programmed to move a displayed cursor from group to group on the menu in response to actuation of the cursor movement keys, and the processor is programmed to select a character within a group in response to actuation of the selection keys. In other embodiments, A+B is greater than or equal to twelve.

The inventive system can be interfaced with a passenger information and entertainment system, for example, to enable a passenger to manipulate a hand-held controller (having few keys) to enter a mailing address for a product purchased by the passenger. For example, the invention could be employed in a version of the passenger information and entertainment system disclosed in U.S. Pat. No. 4,866,515, issued Sep. 12, 1989, and assigned to Sony Corporation.

DESCRIPTION OF THE PREFERRED EMBODIMENTS

Figure 1:
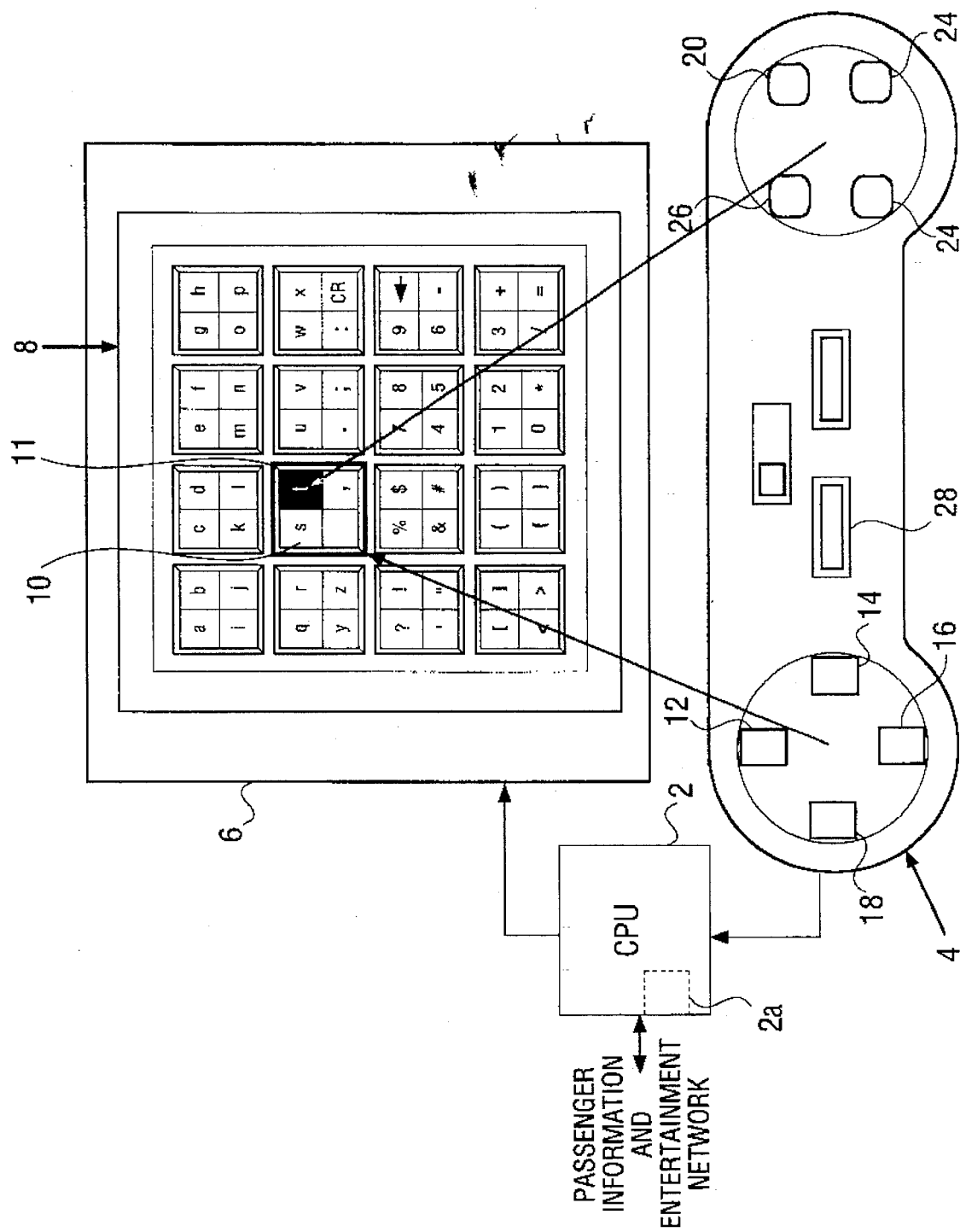
FIG. 1 is a block diagram of a computer system embodying the invention.

A first preferred embodiment of the inventive system will be described with reference to FIG. 1. The computer system of FIG. 1 includes central processing unit (CPU) 2, input device 4 connected to CPU 2, and display device 6 connected to CPU 2. CPU is programmed with software for displaying character selection menu 8 on the screen of display device 6. Menu 8 includes sixteen displayed groups of characters. Each group of characters includes four characters. For example, group 10 includes a "s" character, a displayed "t" character, a displayed "blank" character (representing a blank space), and a displayed "," character.

Input device 4 includes four cursor movement keys (12, 14, 16, and 18), four selection keys (20, 22, 24, and 26), and a menu shift key 28.

CPU 2 is programmed to move displayed cursor 11 from group to group on character selection menu 8 in response to actuation of cursor movement keys 12, 14, 16, and 18. More specifically, CPU 2 is programmed to move cursor 11 up (toward the top of FIG. 1) by one group each time the user strikes (or otherwise selects) key 12, to move cursor 11 to the right by one group each time the user strikes (or otherwise selects) key 14, to move cursor 11 down by one group each time the user strikes (or otherwise selects) key 16, and to move cursor 11 to the left by one group each time the user strikes (or otherwise selects) key 18. Thus, the user can cause CPU 2 to move cursor 11 to any of the character groups by selecting a sequence of six (or less) of the cursor movement keys.

Input device 2 is shaped to be conveniently held by both hands of a user, so that the user can conveniently manipulate keys 12, 14, 16, and 18 using his (or her) left thumb or fingers, and so that the user can conveniently manipulate keys 20, 22, 24, and 26 using his (or her) right thumb or fingers.

CPU 2 is programmed to select a character within a displayed group in response to actuation of selection key 20, 22, 24, or 26. More specifically, CPU 2 is programmed to select the upper-right character of the group (i.e., character "t" of group 10 of FIG. 1) each time the user strikes (or otherwise selects) key 20, to select the lower-right character of the group (i.e., character "," of group 10 of FIG. 1) each time the user strikes (or otherwise selects) key 22, to select the upper-left character of the group each time the user strikes (or otherwise selects) key 24, and to select the lower-left character of the group each time the user strikes (or otherwise selects) key 26.

Input device 4 also includes shift key 28. CPU 2 is programmed to display a different character selection menu each time the user strikes shift key 28. For example, CPU 2 can be programmed to display the menu 38 (shown in FIG. 2) on display device 6 in response to depression of key 28, and to display the menu 48 (shown in FIG. 3) on display device 6 in response to a second depression of key 28.

Throughout the specification, including in the claims, a displayed representation is said to be "highlighted" if a cursor (such as cursor 11 of FIGS. 1-3) is displayed as a border surrounding or outlining the representation, or if a cursor gives a distinctive color or brightness to the representation, or if the representation is otherwise caused to have a distinctive appearance. In the preferred menus shown in FIGS. 1-3, cursor 11 is employed to highlight (by outlining) one displayed group of character representations (e.g., group 10) at a time.

Figure 2:
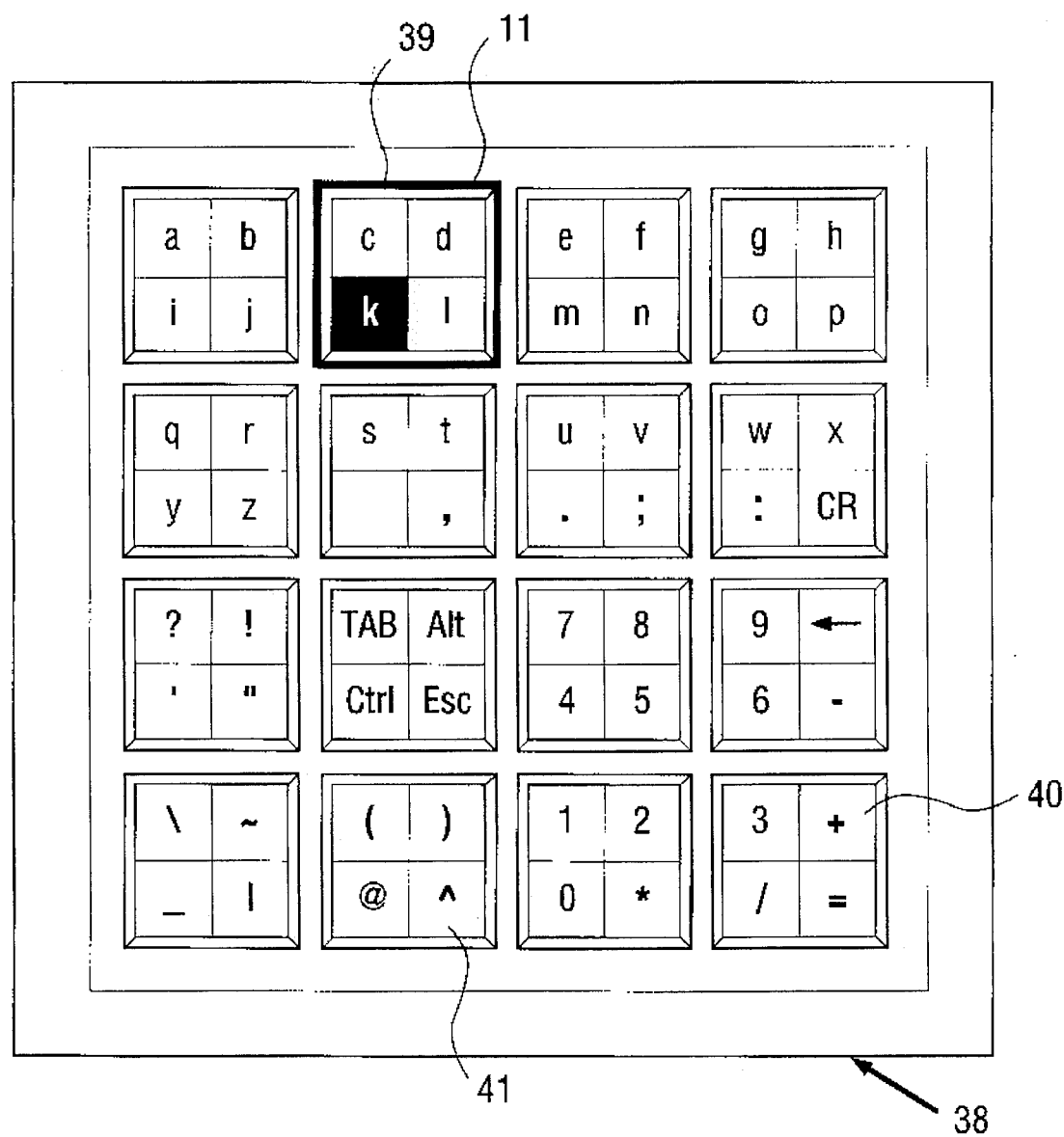
FIG. 2 is a first character selection menu which can be displayed by the FIG. 1 system.

With reference to FIG. 2, character selection menu 38 displays sixteen groups (sometimes referred to herein as "quads") of character representations (each quad representing four characters). Thus, any of sixty-four different characters (all "lower case" characters) can be selected by manipulating the keys of input device 4 while viewing menu 38 on display device 6. For example, the following steps can be performed to select the character "k" (whose representation is displayed in the lower left corner of quad 39, which is the second quad from the left in the top row of quads), assuming displayed cursor 11 currently highlights quad 40 in the bottom row of quads. First, the user's left thumb strikes left movement key 18 twice (to cause cursor 11 to highlight quad 41 ), and then strikes upward movement key 12 three times (to cause cursor 11 to highlight quad 39). Next, the user's right thumb strikes "lower-left" selection key 24 to select character "k". Only six keystrokes (button presses) are required to select character "k" (and enter it to CPU 2) in this situation. By allowing group cursor "roll around" it is possible to select character "k" in fewer than six button presses. With group cursor roll around, pressing a "down" button rolls the cursor from a quad in a bottom row (e.g., quad 40) around to the top row. Pressing a "right" button twice then rolls the cursor around to quad 39. Pressing the lower left selection key 24 then selects "k". This is a total of only 4 button presses (a 33% reduction): 3 group cursor moves and 1 symbol select. "Roll around" implies that when the cursor is on the left edge (e.g., highlights a group in the leftmost column of groups) and you press a "left" move button to move the cursor to the left, the cursor arrives at the right edge (e.g., highlights a group in the rightmost column), or if the cursor is at the top edge and you press an "up" button to move the cursor up, the cursor arrives at the bottom edge. Roll around is an important technique with the inventive symbol entry method since it significantly reduces the number of required button presses to reach the desired group.

Preferably, CPU 2 is programmed to highlight (automatically) the quad portion corresponding to the most recently selected character, in the sense that CPU 2 causes this quad portion to be displayed with distinctive color or brightness.

It is contemplated that a selection of a sequence of displayed characters defines a particular character. For, example consider the "Ctrl" and "Alt" characters displayed in the third row of quads from the top of menu 38 in FIG. 2. If the user first selects "Alt" (or "Ctrl") and then selects one of the numerical characters (for example "7"), CPU 2 will interpret this two-character sequence as a single character (different than character "7").

Figure 3:
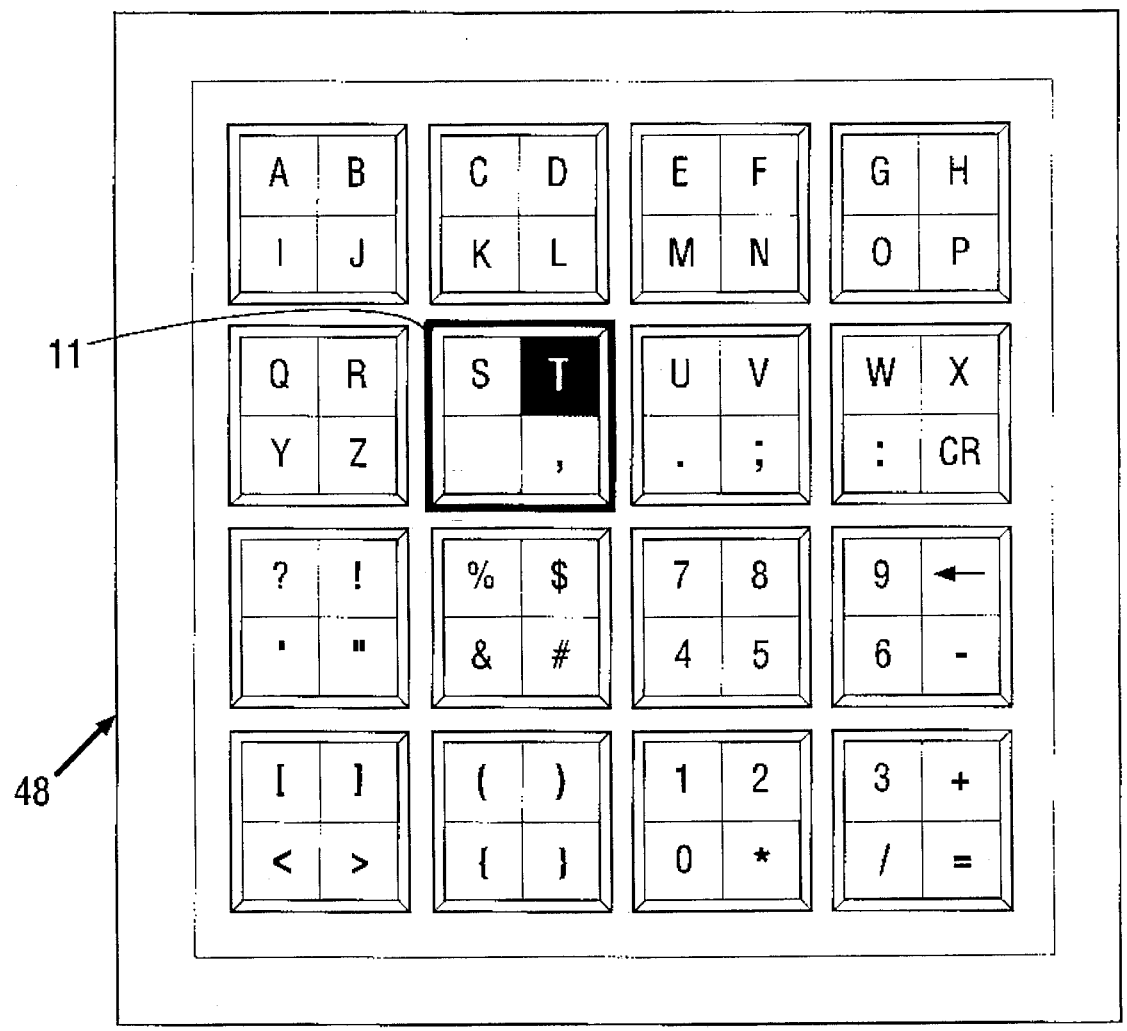
FIG. 3 is a second character selection menu which can be displayed by the FIG. 1 system.

With reference to FIG. 3, character selection menu 48 displays sixteen quads of character representations, each quad representing four characters. Thus, any of sixty-four different characters ("upper case" characters) can be selected by manipulating the keys of input device 4 while viewing menu 48 on display device 6.

With reference again to FIG. 1, CPU 2 preferably includes circuitry 2a for interfacing with a passenger information and entertainment network (and CPU 2 is preferably programmed with necessary software for communicating with such a network). If CPU 2 has this capability and is connected with such a network, the user of the FIG. 1 system might view image data such as video (on display device 6), or execute software data, that have been transmitted over the network to CPU 2 from a central station. When executing application software for purchasing items (for example, items displayed on device 6) over the network, the passenger/user may purchase an item (or designate a mailing or billing address) by entering alphanumeric text in accordance with the invention by manipulating keys 12–26 in the above-described manner. CPU 2 could then transmit the text (formatted and/or encoded as appropriate) through interface circuitry 2a to the network.

In variations on the preferred embodiment of FIG. 1, the inventive input device has A cursor movement keys and B selection keys (where each of A and B is an integer, A+B is less than twelve, and B is not less than two), and each character selection menu displays C groups (clusters) of character representations, each group consisting of representations of B characters (where C is a positive integer). In one example, A=4, B=6, and C=25. In each of these variations, just as in FIG. 1, the processor of the computer system is programmed to move a displayed cursor from group to group on the character selection menu in response to actuation of the cursor movement keys, and the processor is programmed to select a character within a group in response to actuation of the selection keys. In an example in which C=25 (the menu consists of five rows of five groups), A=4, B=6, and the user depresses one of the six selection keys to select a corresponding one of the six displayed representations of characters in a group "highlighted" by a displayed cursor.

In other variations, the menu may display three rows of three groups, with 4 symbols per group for a total of 3×3×4=36 symbols per display page (displayed menu), and there may be three or more available display pages (which can be sequentially displayed one page at a time). Three of such stacked display pages would represent up to 108 symbols. Repeated actuation of a "shift" button (e.g., menu shift key 28 of FIG. 1) could "pop" successive pages to the top of the stack (sequentially display them).

In other variations, the characters displayed on the selection menus are pictographic symbols such as those of the Chinese and Japanese languages. An 8×8 grid of display groups of such symbols, with 16 symbols per group, would represent 1024 symbols per displayed menu (page). A relatively small number of stacked menus (pages) would represent most commonly used symbols of a language such as Chinese or Japanese.

In other variations, the displayed characters are math symbols, or symbols other than alphanumeric symbols.

Probably, the most useful embodiments of the invention will be those whose character selection menus display 3×3 (three row by three column) grids of groups (with 4 symbols per group), or 4×3 grids of groups (with 4 symbols per group), or 4×4 grids of groups (with 4 symbols per group). This is because most systems using a hand controller will probably have a display screen whose size and resolution are too small to permit display of larger grids of groups as character selection menus.

Various other modifications and alterations in the invention's design and method of operation will be apparent to those skilled in the art without departing from the scope and spirit of the invention. Although specific preferred embodiments of the invention have been described, it should be understood that the invention as claimed should not be unduly limited to such specific embodiments.

What is claimed is:

1. A method for entering text into a computer system using an input device having keys, including the steps of:

(a) displaying on a display device a character selection menu which includes simultaneously displayed groups of character representations, each of said groups including representations of B characters, where B is a positive integer not less than two and where the characters within each group are arranged in a pattern;

(b) highlighting a selected one of the groups in response to actuation of a first set of the keys; and (c) selecting a character representation within the selected one of the groups in response to actuation of one of a second set of the keys, where said second set of the keys consists of B of the keys and where said second set of the keys is separate from the display device and is arranged in a pattern corresponding to the pattern of the characters within each group.

2. The method of claim 1, also including the step of:

(d) displaying a second character selection menu including displayed groups of character representations, each of said groups including representations of B characters, in response to actuation of a shift key of the input device.

3. The method of claim 2, also including the step of:

(c) displaying a third character selection menu including displayed groups of character representations, in response to another actuation of said shift key of the input device.

4. The method of claim 1, wherein the first set of the keys has at least one cursor movement key and the second set of the keys includes a set of at least two selection keys, wherein step (b) includes the step of highlighting the selected one of the groups in response to actuation of said at least one cursor movement key, and wherein step (c) includes the step of selecting said character representation within said selected one of the groups in response to actuation of one of the selection keys.

5. The method of claim 4, wherein the set of at least two selection keys consists of four selection keys.

6. The method of claim 1, wherein step (b) includes the step of:

moving a displayed cursor to the selected one of the groups in response to actuation of the first set of the keys.

7. The method of claim 1, wherein the character selection menu displays the groups as an array of columns and rows of said groups, and wherein step (b) includes the steps of:

(d) highlighting a first one of the groups in one of the columns and in an uppermost one of the rows in response to actuation of the first set of the keys; and (e) after step (d), actuating one of the first set of the keys to execute a cursor roll around operation, thereby highlighting a second one of the groups in said one of the columns but in a lowermost one of the rows.

8. The method of claim 1, wherein the character selection menu displays the groups as array columns and rows of said groups, and wherein step (b) includes the steps of:

(d) highlighting a first one of the groups in one of the rows and in a leftmost one of the columns in response to actuation of the first set of the keys, and (e) after step (d), actuating one of the first set of the keys to execute a cursor roll around operation, thereby highlighting a second one of the groups in said one of the rows but in a rightmost one of the columns.

9. A system for entering text into a computer system, including:

a processor;

a display device connected to the processor; and an input device connected to the processor, said input device including keys, wherein the processor is programmed with software for displaying on the display device a character selection menu including simultaneously displayed groups of character representations, each of said groups including representations of B characters, the characters within each group arranged in a pattern, highlighting a selected one of the groups in response to actuation of a first set of the keys, and selecting a character representation within the selected one of the groups in response to actuation of a one of a second set of the keys, where said second set of the keys consists of B of the keys, where B is a positive integer not less than two, and where said second set of the keys is separate from the display device and is arranged in a pattern corresponding to the pattern of the characters within each group.

10. The system of claim 9, wherein the first set of the keys consists of at least one cursor movement key and the second set of the keys consists of B selection keys, and wherein the processor is programmed with software for highlighting the selected one of the groups in response to actuation of the at least one cursor movement key, and selecting said character representation within said selected one of the groups in response to actuation of one of the selection keys.

11. The system of claim 10, wherein B=4.

12. The system of claim 11, wherein the first set of the keys consists of four cursor movement keys, and wherein the processor is programmed with software for moving a displayed cursor to the selected one of the groups in response to sequential actuation of the cursor movement keys.

13. The system of claim 9, wherein the input device includes a shift key, and wherein the processor is programmed with software for displaying a second character selection menu in response to actuation of the shift key, wherein the second character selection menu includes displayed groups of character representations, each of said groups consisting of representations of B characters.

14. The system of claim 13, wherein the character selection menu includes displayed groups of representations of lower case characters, and the second character selection menu includes displayed groups of representations of upper case characters.

15. The system of claim 9, wherein the processor is programmed with software for moving a displayed cursor to the selected one of the groups in response to actuation of the first set of the keys.

16. The system of claim 9, wherein B=4.

17. The system of claim 9, wherein the input device has less than twelve keys.

18. The system of claim 9, wherein the processor includes means for communicating with a passenger information and entertainment network.

19. The system of claim 18, wherein the processor includes means for sending alphanumeric text that has been entered into said computer system to the passenger information and entertainment network.

20. The system of claim 9, wherein the text is alphanumeric text.

* * * * *